United States Patent [19]

Farrar

[11] Patent Number: 5,338,349

[45] Date of Patent: Aug. 16, 1994

[54] FIRE RESISTANT AND HIGH TEMPERATURE INSULATING COMPOSITION

[75] Inventor: Randolph C. Farrar, Cape Girardeau, Mo.

[73] Assignee: FireComp, Inc., Cape Girardeau, Mo.

[21] Appl. No.: 66,471

[22] Filed: May 24, 1993

Related U.S. Application Data

[63] Continuation-in-part of Ser. No. 936,112, Aug. 27, 1992, abandoned.

[51] Int. Cl.$^5$ .............................................. C09K 21/02
[52] U.S. Cl. ............................ 106/18.12; 106/15.05; 106/711; 106/803; 106/805; 106/811; 106/814; 106/817; 106/DIG. 2; 106/DIG. 3; 252/62; 252/601; 252/604; 428/289; 428/411.1; 428/428; 428/446; 428/457; 428/537.1; 428/537.5; 428/537.7; 428/702; 428/703; 428/920; 428/921
[58] Field of Search ................. 106/15.05, 18.12, 711, 106/803, 805, 811, 814, 817, DIG. 2, DIG. 3; 252/62, 601, 604; 428/289, 411.1, 428, 446, 457, 537.1, 537.5, 537.7, 702, 703, 920, 921

[56] References Cited

U.S. PATENT DOCUMENTS

| | | | |
|---|---|---|---|
| 2,131,374 | 9/1938 | Grunwald et al. | 106/672 |
| 3,326,706 | 6/1967 | Deloye et al. | 106/672 |
| 3,630,762 | 12/1971 | Olton et al. | 106/232 |
| 3,998,651 | 12/1976 | Baudouin et al. | 106/464 |
| 4,164,596 | 8/1979 | Meister | 427/226 |
| 4,229,222 | 10/1980 | Schneider | 252/62 |
| 4,244,781 | 1/1981 | Heckman | 252/62 |
| 4,313,997 | 2/1982 | Ruff et al. | 428/220 |
| 4,419,256 | 12/1983 | Loomis | 106/18.12 |
| 4,486,546 | 12/1984 | Murakami et al. | 501/154 |
| 4,608,087 | 8/1986 | Yoshino et al. | 106/18.12 |
| 4,720,414 | 1/1988 | Burga | 428/920 |
| 4,746,555 | 5/1988 | Luckanuck | 428/35 |
| 4,851,044 | 7/1989 | Stawinski | 106/18.12 |
| 5,035,951 | 7/1991 | Dimanshteyn | 428/446 |

FOREIGN PATENT DOCUMENTS

2147627 9/1971 Fed. Rep. of Germany ... 106/18.12

*Primary Examiner*—Anthony Green
*Attorney, Agent, or Firm*—Rogers, Howell & Haferkamp

[57] ABSTRACT

A fire resistant and high temperature insulating composition is provided. The composition generally comprises a carbonate material in an amount from about 20% to about 80% by weight, an aluminosilicate in amount from about 0.5% to about 15% by weight, talc in amount from about 0.5% to about 10% by weight, cellulose in amount from about 1% to about 30% by weight, a binder in an amount from about 1% to about 45% by weight, and a gelling agent in an amount from about 1% to about 45% by weight. The binder is preferably a mixture of an organic adhesive such as a polymeric resin, and a non-organic adhesive such as cement, but other adhesives can be used alone or in combination therewith. The gelling agent is preferably a polymeric substance that swells in the presence of a liquid such as superabsorbent polymers. The components are combined and water may be added in an amount from about 1 to about 50% by weight to obtain a composition of the desired consistency. The composition can be used as a coating composition or it can be used to manufacture articles comprised of the composition.

36 Claims, 1 Drawing Sheet

FIRE RESISTANT AND HIGH TEMPERATURE INSULATING COMPOSITION

This is a continuation-in-part of my co-pending patent application having U.S. Ser. No.07/936,112 which was filed on Aug. 27, 1992, and now abandoned, the entirety of which is incorporated herein by reference hereto.

BACKGROUND OF THE INVENTION (1) Field of the Invention

This invention generally relates to fire resistant and heat insulating compositions and more particularly to compositions capable of withstanding direct exposure to flames and high temperatures.

(2) Description of the Related Art

Various fire resistant and/or heat insulating materials or compositions are known. For example, masonry materials, such as fire brick, are capable of providing a fire or heat barrier, but are of limited usefulness as a fire resistant coating because these materials are generally not available in a pliant, moldable form. Furthermore, masonry materials are heavy and cumbersome to use, as well as costly. Drywall, which is typically comprised of compressed gypsum sandwiched between paperboard panels, is often used as a fire barrier, but its fire resistance properties are dependent upon the thickness of the drywall. Generally, drywall that is at least ⅜" thick is considered "fire resistant drywall." Even though considered "fire resistant", drywall of this thickness will readily burn when directly exposed to flames. Therefore, "fire-resistant" drywall is not considered an effective fire barrier for high temperature applications or applications involving exposure to flames. Furthermore, drywall is not suitable for coating and molding applications.

Another group of fire and heat resistant compositions are those that contain asbestos. Although asbestos-containing compositions are considered effective in providing fire-resistance and heat insulating properties, it has been discovered that exposure to asbestos can result in adverse health consequences and its use has been severely restricted. Various non-asbestos containing fire-proofing and insulating compositions have subsequently been developed which have not been altogether adequate for high temperature applications.

One non-asbestos containing fireproofing composition is disclosed in U.S. Pat. No. 4,851,044. The composition disclosed therein consists primarily of a mixture of exfoliated vermiculite, clay, silica, mica, biotite and an organic adhesive. This composition is of limited usefulness in high temperature applications because it cannot withstand exposure to flames. Further, vermiculite is known to burn when directly exposed to flames.

Other problems have been associated with various other fire-resistant or heat insulating compositions such as the release of smoke or noxious fumes when exposed to high temperatures or flames, the breakdown of the material after prolonged exposure to high temperatures, or the unsuitability of a composition for use as a coating onto an article or for molding into a particular shape.

Numerous industrial applications require the use of a fire-resistant material as a coating on various devices or, in the event a fire breaks out, to serve as a fire stop or barrier to confine the fire. A particular need is known to exist in the nuclear power plant industry where it is necessary to protect electrical circuits, machinery, conduit, pipes and the like.

A need exists, therefore, for a non-asbestos containing fire resistant and high temperature insulating composition that overcomes the foregoing problems.

SUMMARY OF THE INVENTION

This invention is directed to fire resistant and high temperature insulating compositions which are suitable for use in industrial applications as a coating for electrical devices and machinery or as a fire barrier. In one embodiment, the composition generally comprises a carbonate material, such as an alkali metal carbonate or an alkaline earth metal carbonate, aluminosilicate, talc, cellulose, a binder and a gelling agent. In this embodiment, the carbonate component is comprised of a mixture of calcium carbonate ($CaCO_3$), magnesium carbonate ($MgCO_3$) and potassium carbonate ($K_2CO_3$). In an alternate embodiment only calcium carbonate or magnesium carbonate is used as the carbonate material and perlite is included in the composition. Typically, calcium carbonate comprises a majority of the carbonate material in the composition. The components of the compositions are mixed together and water added to obtain a mixture of the desired consistency. Other optional components, such as aluminum sulfate, dyes or fungicides, can be added to the composition as desired.

The present invention is further directed to a novel article coated with a composition of this invention rendering the article fire and heat resistant. The composition can be coated onto articles made of wood, glass, ceramic, plastic, metal, concrete, paper, fabric, rubber, and other materials.

The present invention is also directed to the manufacture of an article comprised of a composition of the present invention. The composition of the present invention can be conveniently manipulated to form an article of virtually any shape or size. The resulting article dries to a rigid article, yet remains relatively lightweight. The composition can also be compressed to form rigid, lightweight sheets, panels, tiles, chips and the like.

Among the several advantages of the present invention may be noted the provision of fire and heat resistant compositions that are particularly useful in high temperature applications; the provision of such compositions that do not release noxious gases or fumes into the atmosphere when exposed to heat or flame; the provision of such compositions that can be subjected to high temperatures for a long period of time with little or no physical or chemical breakdown of the composition; the provision of such compositions that can be easily applied to an article to provide fire and heat resistance as well as insulating properties to the article; the provision of such compositions that can be easily manipulated to form rigid, lightweight fire resistant articles; the provision of a fire resistant material that can shield a coated object from an external fire for more than one hour; the provision of a fire and heat resistant composition which does not burn through when exposed directly to flames; the provision of a fireproofing and insulating composition that is virtually dust-free as it is being applied; and the provision of such a composition that can be economically and easily prepared from available starting materials.

BRIEF DESCRIPTION OF THE DRAWING FIGURE

FIG. 1 is a graph illustrating the effects of the application of direct flames to an article formed from a composition of the present invention.

DETAILED DESCRIPTION OF THE PREFERRED EMBODIMENTS

Figure 1:
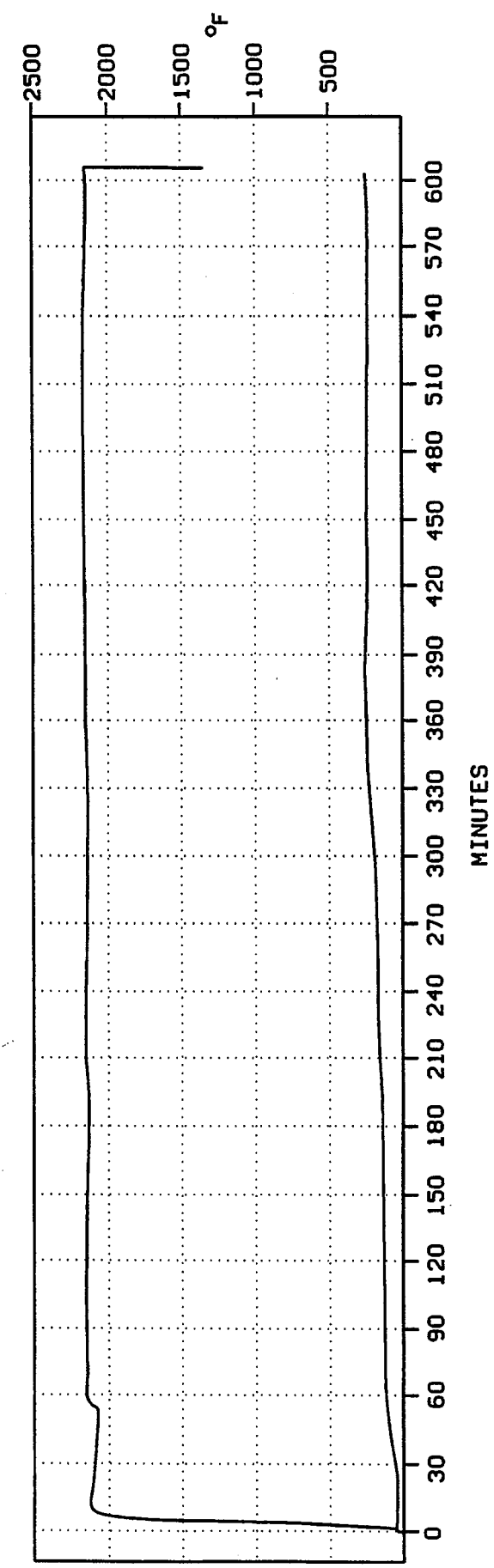

In accordance with the present invention, it has been discovered that effective fire and heat resistant compositions can be prepared without the inclusion of asbestos in the composition and that such compositions are capable of tolerating temperatures and flames having a temperature greater than 2000° F. As a result, the compositions provide fire and heat resistance as well as insulating properties to an article coated with the composition or to an article formed of the composition. Articles coated or formed in this manner can be used in applications involving exposure to high temperatures or to protect objects from exposure to flames. Moreover, the composition can be prepared as a pliant, paste-like mixture that permits its formation into articles of any desired shape or size and also permits its use as a coating composition to be applied onto or around variously shaped or sized articles. The composition typically dries within 24–72 hours, depending upon the thickness of the composition and the drying temperature, to yield a rigid article or coating. The drying process can be assisted by the application of heat or forced air.

An article comprised of or coated with a composition of this invention is capable of withstanding intense heat or the direct application of flames without combusting or releasing any noxious smoke or fumes. The composition also provides high-temperature insulating properties by substantially limiting the amount of heat passing through the composition into the article coated with the composition or by providing a barrier to heat radiating into the protected environment from an outside heat source. The composition can also be prepared as a fluid mixture that permits its use in spray applications such as a fire-extinguishing material.

According to the present invention, a composition is provided which generally comprises a mixture of a carbonate material, an aluminosilicate substance, talc, cellulose, a binder and a gelling agent. These components are mixed together and water added to obtain a mixture of the desired consistency.

As used in this application, the phrase carbonate material means alkali metal carbonates, alkaline earth metal carbonates and carbonate minerals. The alkali metal carbonate or alkaline earth metal carbonate is preferably chosen from the group consisting of $CaCO_3$, $MgCO_3$, and $K_2CO_3$. Other carbonates containing alkali metal or alkaline earth metals such as the carbonate mineral dolomite ($CaMg(CO_3)_2$) or siderite ($FeCO_3$) can also be used. It is also believed that bicarbonates can be used advantageously in the compositions of this invention. In one embodiment, the carbonate material is comprised of a combination of $CaCO_3$, $MgCO_3$, and $K_2CO_3$. The carbonate material is preferably present in an amount from about 20% to about 80% by weight. Various mixtures of the amounts of the carbonate material can be utilized. For example, the carbonate material may contain a mixture of $CaCO_3$ or $MgCO_3$ in an amount from about 20% to about 80% by weight and $K_2CO_3$ in an amount from about 0.5% to about 10% by weight, or the carbonate material may comprise $CaCO_3$ in an amount of about 57%, $MgCO_3$ in an amount of about 1.5%, and $K_2CO_3$ in an amount of about 1.5%. In one embodiment, the $CaCO_3$ is present in an amount from about 20% to about 75% by weight, and more preferably, comprises about 55%–57% by weight of the composition. The $MgCO_3$ is present in the composition in an amount from about 0.5% to about 10% by weight, and more preferably comprises about 1.5% by weight of the composition. The $K_2CO_3$ is present in the composition in an amount from about 0.5% to about 20% by weight, and more preferably comprises about 1.5% by weight of the composition. Each of these carbonate materials can be obtained from available commercial sources and is preferably ground to a fine powder having a particle size in the range of 100–800 microns prior to its use. The powder can be filtered through an appropriately sized mesh filter or screen to obtain the desired particle size.

The aluminosilicate substance is preferably employed in an amount from about 0.5% to about 15% by weight in the composition. The term aluminosilicate as used herein refers to any naturally occurring aluminosilicate mineral such as clays and mica and mixtures thereof. Preferably, an aluminosilicate substance is present in an amount of about 2% by weight of the composition. In an alternate embodiment, the aluminosilicate is comprised of a combination of mica in an amount of about 10% and clay in an amount of about 5%. The aluminosilicate substances are usually obtained as flakes which are ground into fine particles o about 200 microns to about 800 microns in size prior to use. In a preferred embodiment of this composition, the aluminosilicate utilized is kaolinire.

The amount of talc in the composition is preferably from about 0.5% to about 10% by weight and, more preferably, about 2% by weight. The talc can be obtained from standard commercial sources in a fine powder form. The powder can be ground further if necessary prior to use.

The cellulose fiber employed in the composition is employed in an amount from about 1% to about 30% by weight and preferably in an amount of about 3% by weight of the composition. The cellulose fiber can be comprised of sawdust or long-fiber paper. Cellulose fibers can be obtained as a powder or a dust from various commercial sources. Alternately, the cellulose fibers can be obtained as waste material resulting from other commercial applications. Preferably, the long-fiber cellulose utilized in the composition is provided in the form of a fine dust.

A binder is used in the composition to hold the various dry components together in the composition. The binder can be any known organic or inorganic binding agent or adhesive. Preferably, an organic adhesive and a non-organic adhesive is used. Examples of suitable organic adhesives include thermoplastic polymeric resins or copolymers. Specifically, liquid polymeric resins of polyvinyl acetate or polyvinyl alcohol are useful in the composition of the present invention. The vinyl acetate polymer emulsion, VINAC XX-210, produced by Air Products and Chemicals, Inc., Allentown, PA and the polyvinyl alcohol, Partall Film #10, produced by Rexco, Carpinteria, CA, are particularly useful. Such binders can be used individually or in combination. In one embodiment of the composition of the invention, the organic adhesive is present in an amount of about 15%. Examples of non-organic binders include Portland cement, masonry cement, and like products.

Other binding agents such as starch, ethylene glycol, hydroxypropyl m-cellulose and the like can also be advantageously employed in the composition of the present invention. Any of these binders can be used individually or a combination of binders can be used.

The binder in this embodiment of the invention preferably comprises about 1% to about 45% by weight of the composition. Preferably, the binder comprises a combination of about 2.5% polyvinyl acetate polymeric resin (VINAC XX-210), about 0.5% polyvinyl alcohol resin (Partall Film #10), about 1% hydroxypropyl m-cellulose, and about 22% masonry cement. These percentages are by the dry weight of the final composition.

Aluminum sulfate can also be added to the composition in an amount comprising about 1% to about 5% by weight of the final composition. Preferably, the aluminum sulfate comprises about 2% by weight of the composition. The inclusion of aluminum sulfate controls the expansion and contraction of the compositions. Other materials capable of performing this function, such as sizers, could also be used.

A gelling agent is employed in the composition in an amount of about 1% to about 25% by weight, and more preferably in an amount of about 5% by weight. Any known organic gelling agent that swells in the presence of a liquid can be used in this composition. The gelling agent selected should be capable of absorbing water and expanding in size to provide a degree of elasticity to the moist composition. Preferably, superabsorbent polymers such as sodium polyacrylate are selected for use as the gelling agent. In a preferred embodiment, sodium polyacrylate in an amount of about 5% by weight of the composition is used.

Water is added to the composition to obtain a desired consistency. Depending upon the intended application, more or less water is added. For example, if the composition is intended to be applied by a spray type device, a more fluid composition is desired and the water percentage is accordingly increased to yield the suitable dilution. The composition typically will comprise water in an amount from about 1% to about 50% by weight. If the desired application is as a coating to be applied to an article, the percentage of water is preferably between about 1% and 25% to form a paste-like, moldable consistency.

The components of the composition can be mixed together in any order although the water is preferably the last component added. The components are mixed until a thorough blending is achieved.

In another embodiment, a fire and heat resistant composition is provided which comprises a mixture of an alkaline earth metal carbonate, such as calcium carbonate or magnesium carbonate, perlite, an aluminosilicate substance, talc, cellulose fiber, a binder and a gelling agent. These components are mixed together with an amount of water necessary to obtain the composition in a desired consistency.

The calcium carbonate or magnesium carbonate in the composition is present in an amount from about 10% to about 60% by weight, preferably from about 25% to about 60% and, more preferably, about 30%. The use of calcium carbonate is preferred, but mixtures of calcium carbonate and magnesium carbonate can be used. Other features of the carbonate material are as previously described.

The preferred amount of perlite in this embodiment is from about 0 5% to about 10% by weight. More preferably, about 5% to about 20% of perlite by weight is present in the composition. In one embodiment, perlite is present in an amount of about 10%. Perlite is a naturally occurring volcanic mineral that typically comprises 65–75% $SiO_2$, 10–20% $Al_2O_3$ and 2–5% $H_2O$. Perlite can be obtained from commercial sources. The perlite is preferably ground to a powder having a particle size from about 200 to about 800 microns, preferably about 600 microns, prior to its use in the formulation of the composition of this invention.

The aluminosilicate substance preferably employed in this composition is present in an amount from about 1% to about 25% by weight. The term aluminosilicate is as previously described. Preferably, a combination of mica and clay is used in this embodiment wherein the mica is employed in an amount from about 5% to about 15% and the clay is employed in an amount from about 1% to about 10%. Most preferably, the composition comprises about 3% clay and 10% mica.

The amount of talc in the composition is preferably from about 5% to about 15% by weight and, more preferably, about 10% by weight.

The cellulose fiber employed in the composition is employed in an amount from about 1% to about 30% by weight, preferably about 10 to about 25% by weight, and more preferably about 20% by weight. The cellulose fiber is as previously described and can comprise sawdust or long-fiber paper, preferably long-fiber cellulose such as that produced under the trade name DRYLAP.

The binder utilized in this embodiment is as previously described and comprises between about 1 to about 25% by weight of the composition. In a preferred embodiment, the binder comprises a combination of about 6% polyvinyl acetate polymeric resin (VINAC XX-210), about polyvinyl alcohol resin Partall Film #10 about 1% corn starch and about 1% Hydroxypropyl m-cellulose This embodiment may optionally contain between about 1% and masonry cement. The percentages are by weight of the final composition.

A gelling agent as previously described is employed in the present invention in an amount of about 1% to about 10% by weight, and more preferably, about 4%.

The components of the composition of this embodiment can be mixed together in any order although the water is preferably the last component added. The components are again mixed until a thorough blending is achieved.

Other components such as a dye or a fungicide can be added as desired to the compositions of this invention without affecting the fire and heat resistant properties of the compositions.

The compositions of the present invention can be prepared as a pliant, moldable paste and used as a coating composition over an article to insulate the article from heat and/or to provide it with fire and heat resistance properties. Any article that could be subjected to high heat or flames can be coated with the compositions of the present invention. The compositions can be applied to articles made of plastic, rubber, wood, paper products, metal, concrete, glass, ceramic, wire, or fabric and the like. In particular, electrical junction boxes, conduit, pipes and machinery can be coated with a composition of the present invention. The compositions can be applied to the article by any means such as a spray, a trowel, hand tools, or manually, depending upon the article. These compositions can also be used to fill voids in block walls to serve as a fireproof barrier and as further insulation.

The compositions can be coated onto an article to any desired thickness, depending upon the desired use. Preferably, the coating is between 1/16" and 2" thick. When a composition is used to form an article, greater thicknesses can be used. It should be understood that the compositions of the present invention can be utilized to form articles comprised of the composition. For example, fireproof wall boards, bricks, tiles, helmets, gaskets, or other objects may be made by forming the desired article from a mixture of the composition. The compositions can be compressed to form thin, lightweight, high density sheets such as for use as a wall board or ceiling panels. These panels can be used to shield rooms or objects from flames or high temperatures. The compositions are also suitable as the material of a mold for use in metal coating and the like. Additional materials may be added to the composition to provide further structural strength such as a wire mesh or sheets of cheesecloth or the like. A fireproof fabric can also be prepared by impregnating a fabric such as polyester or the like with a composition of the invention. The composition in its dry form can also be painted with a latex paint.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

EXAMPLE 1

This example serves to illustrate the fire resistant properties of the composition of the present invention.

The composition was prepared as follows:

30% calcium carbonate, 10% perlite, 6% polyvinyl acetate, 2% polyvinyl alcohol, 12% mica, 10% talc, 3% clay, 1% corn starch, 1% ethylene glycol, 1% hydroxypropyl m-cellulose, 20% Drylap (long-fiber cellulose paper), and 4% sodium polyacrylate. Mixing was continued until the components were thoroughly blended. Water was added to obtain a composition having a thick, pasty consistency.

The composition while still wet was applied over an individual's hand to fully cover the hand with approximately a $\frac{3}{8}$" coating of the composition. A cutting flame from an oxygen-acetylene torch having a temperature of approximately 5800° F. was applied from a distance of about 3-4" to the composition for approximately 5 minutes.

The individual felt no heat from the torch and the flame from the torch deflected off of the composition. No noxious gas, fumes, or smoke were emitted and the composition was unchanged.

EXAMPLE 2

This example serves to illustrate the fire resistant and insulating properties of the composition of the present invention.

The composition as described in Example 1 was applied onto one side of a corrugated steel surface to a thickness of approximately $\frac{1}{2}$" inch. The composition was allowed to air dry for 72 hours resulting in a dry, solid coating adhering to the steel surface. Again using an oxygen-acetylene cutting torch as described in Example 1, a flame was applied directly to the uncoated side of the steel and within minutes a discoloration appeared on the steel indicating the transfer of heat to the steel. The coated side remained cool to the touch.

The flame was then applied directly to the coated surface for a period of 5 minutes. The coated surface did not burn, flake, or powder as a result of the application of the flame to the surface. The uncoated side of the steel directly behind the portion exposed to the flames remained cool to the touch.

EXAMPLE 3

This example serves to illustrate the ability of the composition of the present invention to protect materials sensitive to heat.

The composition as described in Example 1 was applied onto a block of polystyrene. The polystyrene block was 10" square and $\frac{3}{4}$" thick. A $\frac{1}{2}$" thick coating of the composition was applied onto one of the large surfaces of the polystyrene block and air dried for 24 hours. The oxygen-acetylene cutting torch as described in Example 1 was again used as the heat source. The flame from the torch was applied from a distance of about 2 inches to a 4" diameter test area for approximately 4 minutes. The flame was deflected off of the coating. No visual effects to the coating composition were observed and no deterioration of the polystyrene was detected. The coating composition adhered strongly to the polystyrene and could only be removed by cutting.

When a flame from the same heat source was applied to an uncoated polystyrene block, the polystyrene caught fire and disintegrated.

EXAMPLE 4

This example serves to illustrate the manufacture of an article comprised of the composition of the subject invention.

The composition as described in Example 1 was formed into a 12" square by $\frac{1}{2}$" thick sheet by applying the composition over a flat wood base. A slightly larger piece of wire mesh was placed on the still wet material (and extending over the edges) and a second layer of the composition, $\frac{1}{2}$" thick, was applied over the wire mesh. A smooth top surface was prepared by the use of a hand trowel. The composition was allowed to air dry for 48 hours. The composition was removed from the wood base to yield a panel approximately 1" thick. The flame from an oxygen-acetylene cutting torch as described in Example 1 was applied to the panel for a period of 6 minutes. No change in the surface texture of the panel could be detected. No heat was transferred to the wire mesh within the panel as it remained cool to the touch.

EXAMPLE 5

This example serves to illustrate the insulating capacity of the composition of the present invention.

A 36" length of copper pipe having a $\frac{3}{4}$" outer diameter and a 0.652" inner diameter was obtained and six (6) inches near the middle of the pipe were coated with a $\frac{3}{8}$" thick layer of the composition as described in Example 1. The coating was allowed to air dry for 48 hours. The flame from an oxygen-acetylene cutting torch as described in Example 1 was applied directly to a portion of the uncoated copper pipe approximately 6" from the coated portion to determine if the heat applied to the copper would transfer to the coating composition. A human hand held the pipe on the coated portion while the heat from the torch was applied to the copper pipe. The flame was applied until the pipe was burned through. The temperature of the coating composition remained constant throughout the entire heating process. The uncoated portion of the copper pipe on the side opposite the coating composition also remained constant.

EXAMPLE 6

This example serves to illustrate the ability of the composition of the present invention to withstand exposure to temperatures of approximately 10,000° F.

A 5/6" layer of the composition as described in Example 1 was applied onto a sheet of Saran wrap having a thickness of 0.001" which was covering a wood base support, The coating material was allowed to dry for 48 hours, A carbon rod arc-air cutting process was used to cut a ¼" thick stainless steel plate placed over the composition, This carbon rod arc-air cutting process creates a localized temperature of approximately 10,000° F. at the location of the electrode. An electric welder was set at 450 amps with an air pressure of 100 psig. A 3/16" carbon stick electrode was used. As the electrode traveled over the stainless steel plate, the plate was completely cut through. The traveling time across the plate was approximately 6 seconds. The composition turned a reddish brown surface color, but no serious deterioration of the composition was detected. The plastic film underneath the composition showed no deleterious effects.

EXAMPLE 7

This example serves to illustrate the stability of the composition of the present invention after prolonged exposure to high temperature.

A previously heat and air dried one gram sample of the composition as described in Example 1 was placed in a Linberg oven set at 1800° F. The sample was removed after one hour and reweighed to determine if any moisture or material was lost. After one hour 0.008 grams was lost. The sample was reinserted in the oven and reweighed every four hours thereafter. After 13 hours in the oven, the sample weighed 0.988 grams and remained constant at that weight throughout the remainder of the study (21 hours). Thus, the cured composition does not degrade or decompose upon prolonged exposure to heat and experiences virtually no shrinkage.

EXAMPLE 8

This example serves to illustrate the ability of the composition of this invention to be compressed into a dense sheet.

A hexagonal mold was constructed and filled to a ¾" depth with the composition as described in Example 1 The mold was then placed under a mating ram on a hydraulic press and the composition was subjected to 75 ton pressure. This yielded a hexagonal chip approximately ¼" thick that was capable of withstanding direct application of flames from the torch as described in Example 1.

EXAMPLE 9

This example serves to illustrate the ability of the composition of the present invention to withstand prolonged exposure to high temperature flames.

The composition of Example 1 was applied to two separate wood bases to a thickness of ¼" and ⅜", respectively. The composition was allowed to air dry for 48 hours. The flame from an oxygen acetylene torch as described in Example 1 was applied to the ¼" coating for 15 minutes and to the ⅜" coating for 30 minutes from a distance of about three inches.

The coatings did not burn or release any smoke or fumes. The underlying wood exhibited some discoloration on the surface, but remained structurally viable.

EXAMPLE 10

This example serves to illustrate the ability of the composition of this invention to form a fireproof fabric.

The composition as described in Example 1 was applied directly onto a sheet of polyester and allowed to absorb into the fabric. This resulted in a thin coating over the fabric having a thickness at about ⅛". The impregnated fabric was allowed to dry under the sun for 10–12 hours.

The flame from a torch as described in Example 1 was applied to the fabric from a distance of about 6" for 3 minutes. The surface of the fabric glowed red, but did not burn or smoke.

EXAMPLE 11

This example serves to illustrate the fireproof and heat resistant properties of a preferred embodiment of a composition of this invention.

The composition was prepared as follows:

55% calcium carbonate, 1.5% magnesium carbonate, 1.5% potassium carbonate, 2% aluminosilicate, 2% talc, 4% long-fiber cellulose, 2.5% polyvinyl acetate, 0.5% polyvinyl alcohol, 23% masonry cement, 1% hydroxypropyl m-cellulose, 2% aluminum sulfate, and 5% sodium polyacrylate were mixed in the order presented. Mixing was continued until the components were thoroughly blended. Water was added to obtain a composition having a thick, pasty consistency. This composition was subjected to the experiments described in Examples 1–6 and 8–10 with substantially identical results. It is believed that this formulation has superior heat resistant properties as illustrated in Example 12.

EXAMPLE 12

The composition of Example 11 was formed into a 9"×10" sheet having a thickness of 3.25". Flames from a 2" nozzle attached to a propane torch were directed at the sheet from a distance of about 6". The flame temperature was approximately 2100° F. and the surface of the sheet exposed to the flame reached approximately 2100° F. shortly after the torch was ignited. The flame remained directed on the sheet and the temperature was maintained for a period of 10 hours. The temperature on the back side of the sheet (not exposed to flames) reached a maximum of 238° F. after approximately 6 hours and then decreased to about 200° F. after 10 hours. The temperature profile of this experiment is illustrated in FIG. 1.

What is claimed is:

1. A fire and heat resistant composition comprising:
   a carbonate material in an amount from about 20% to about 80% by weight;
   aluminosilicate in an amount from about 0.5% to about 15% by weight;
   talc in an amount from about 0.5% to about 10% by weight;
   cellulose in an amount from about 1% to about 30% by weight;
   a binder in an amount from about 1% to about 45% by weight;

a gelling agent in an amount from about 1% to about 25% by weight.

2. The composition of claim 1 wherein the carbonate material is an alkaline earth metal carbonate or an alkali metal carbonate.

3. The composition of claim 2 wherein said alkaline earth metal carbonate or alkali metal carbonate is selected from the group consisting of $CaCO_3$, $MgCO_3$, and $K_2CO_3$.

4. The composition of claim 3 wherein said composition contains a mixture of $CaCO_3$ or $MgCO_3$ in an amount from about 20% to about 80% by weight and $K_2CO_3$ in an amount from about 0.5% to about 10% by weight.

5. The composition of claim 1 wherein the amount of the carbonate material is about 60% by weight.

6. The composition of claim 5 wherein the carbonate material is $CaCO_3$.

7. The composition of claim 2 wherein the carbonate material comprises $CaCO_3$ in an amount of about 57%, $MgCO_3$ in an amount of about 1.5%, and $K_2CO_3$ in an amount of about 1.5%.

8. The composition of claim 1 further comprising aluminum sulfate in an amount from about 0.5% to about 5% by weight.

9. The composition of claim 1 wherein the binder is selected from the group consisting of non-organic cements, organic adhesives, and mixtures thereof.

10. The composition of claim 9 wherein the binder is present in an amount of about 25% by weight.

11. The composition of claim 10 wherein the binder comprises a mixture of masonry cement in an amount of about 22% by weight, polyvinyl acetate in an amount of about 2.5% by weight, polyvinyl alcohol in an amount of about 0.5% by weight and hydroxypropyl m-cellulose in an amount of about 1% by weight.

12. The composition of claim 1 wherein the aluminosilicate is elected from the group consisting of mica, clay and mixtures thereof.

13. The composition of claim 12 wherein the aluminosilicate is present in an amount of about 2% by weight.

14. The composition of claim 1 wherein said cellulose is selected from the group consisting of long-fiber cellulose and sawdust.

15. The composition of claim 14 wherein the cellulose is present in an amount of about 3% by weight.

16. The composition of claim 1 wherein the gelling agent is sodium polyacrylate in an amount of about 5% by weight.

17. The composition of claim 1 further comprising free water in an amount from about 1% to about 50% by weight.

18. The composition of claim 1 further comprising a fungicide.

19. A fire and heat resistant composition comprising:
calcium carbonate or magnesium carbonate in an amount from about 20 to about 60% by weight;
perlite in an amount from about 5 to about 20% by weight;
an aluminosilicate in an amount from about 1 to about 25% by weight;
talc in an amount from about 5 to about 15% by weight;
cellulose fiber in an amount from about 10 to about 25% by weight;
a binder in an amount from about 1 to about 25% by weight; and
a gelling agent in an amount from about 1 to about 10% by weight.

20. The composition as set forth in claim 19 wherein said binder comprises an organic adhesive.

21. The composition as set forth in claim 20 wherein said organic adhesive is present in the composition in an amount of about 15%.

22. The composition as set forth in claim 21 wherein said organic adhesive is a polyvinyl acetate or polyvinyl alcohol liquid resin.

23. The composition as set forth in claim 19 wherein said calcium carbonate or magnesium carbonate is present in an amount of about 30%.

24. The composition as set forth in claim 19 wherein said perlite is present in an amount of about 10%.

25. The composition as set forth in claim 19 wherein said aluminosilicate is selected from the group consisting of mica, clay and mixtures thereof.

26. The composition as set forth in claim 25 wherein said aluminosilicate comprises a combination of mica in an amount of about 10% and clay in an amount of about 5%.

27. The composition as set forth in claim 19 wherein said talc is present in an amount of about 10%.

28. The composition as set forth in claim 19 wherein said cellulose fiber is selected from the group consisting of long-fiber cellulose and sawdust.

29. The composition as set forth in claim 28 wherein said cellulose fiber is present in an amount of about 20%.

30. The composition as set forth in claim 19 further comprising water in an amount of about 1 to about 50% by weight.

31. The composition as set forth in claim 19 wherein said gelling agent is sodium polyacrylate.

32. The composition as set forth in claim 19 further comprising a fungicide.

33. A fire and heat resistant composition consisting essentially of:
calcium carbonate in an amount of about 57%;
magnesium carbonate in an amount of about 1.5%;
potassium carbonate in an amount of about 1.5%;
aluminosilicate in an amount of about 2%;
talc in an amount of about 2%;
cellulose fiber in an amount of about 3%;
polyvinyl acetate in an amount of about 2.5%;
polyvinyl alcohol in an amount of about 0.5%;
masonry cement in an amount of about 22%;
hydroxypropyl m-cellulose in an amount of about 1%;
aluminum sulfate in an amount of about 2%; and
sodium polyacrylate in an amount of about 5%.

34. A fire and heat resistant article comprising:
an article coated with a coating composition comprising:
a carbonate material in an amount from about 20% to about 80% by weight;
aluminosilicate in an amount from about 0.5% to about 15% by weight;
talc in an amount from about 0.5% to about 10% by weight;
cellulose in an amount from about 1% to about 30% by weight;
a binder in an amount from about 1% to about 45% by weight;
a gelling agent in an amount from about 1% to about by weight.

35. The coated article as set forth in claim 34 wherein said article is formed from plastic, rubber, wood, paper products, metal, concrete, glass, ceramic or fabric.

36. A rigid article formed of a composition comprising a carbonate material in an amount from about 20% to about 80% by weight;

aluminosilicate in an amount from about 0.5% to about 15% by weight;

talc in an amount from about 0.5% to about 10% by weight;

cellulose in an amount from about 1% to about 30% by weight;

a binder in an amount from about 1% to about 45% by weight;

a gelling agent in an amount from about 1% to about 25% by weight.

* * * * *